No. 859,359. PATENTED JULY 9, 1907.
E. F. W. ALEXANDERSON.
FREQUENCY CHANGER.
APPLICATION FILED AUG. 24, 1905.
2 SHEETS—SHEET 1.
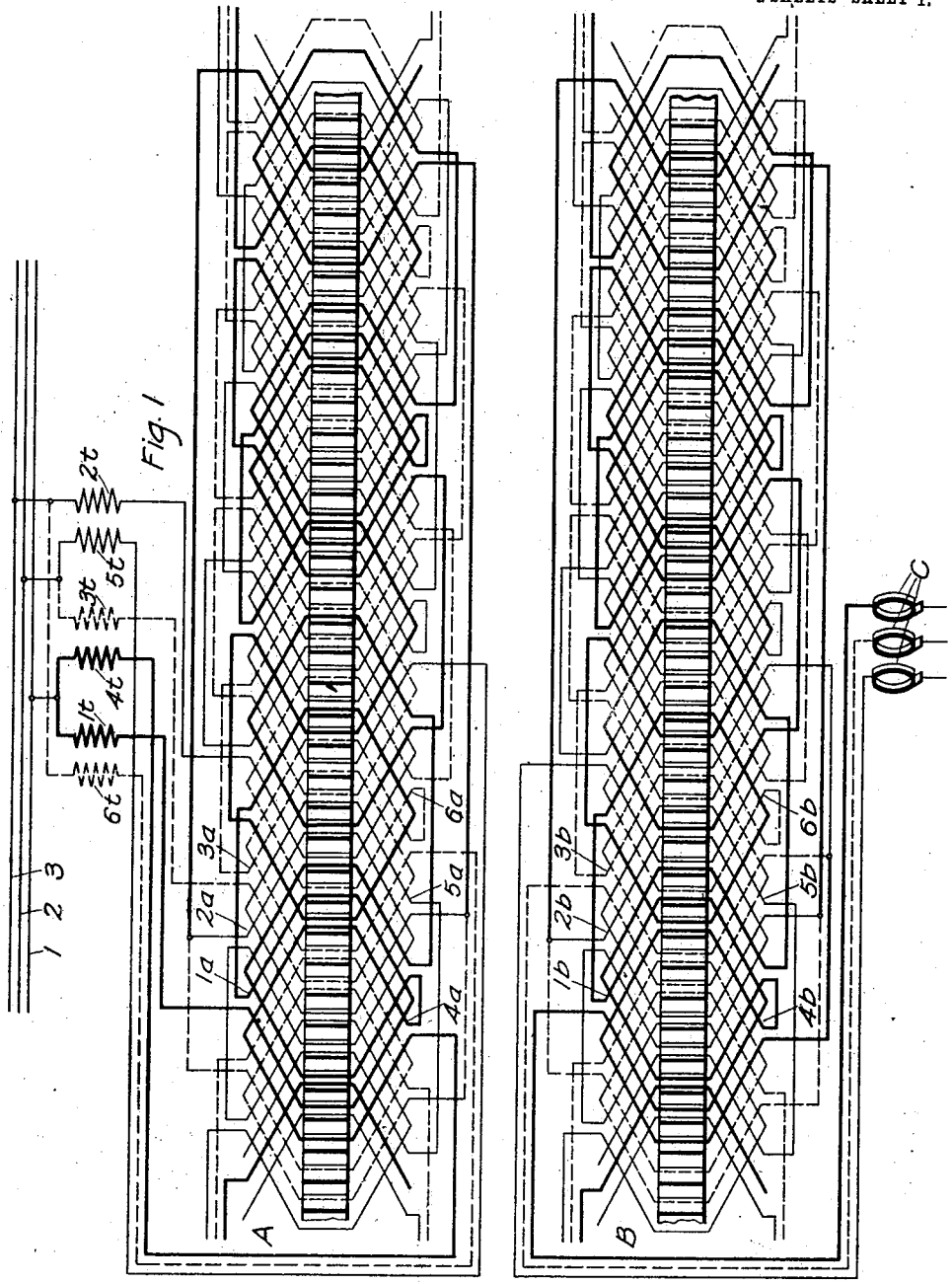
Witnesses:
Inventor:
Ernst F. W. Alexanderson
By Albert G. Davis
Atty.

No. 859,359. PATENTED JULY 9, 1907.
E. F. W. ALEXANDERSON.
FREQUENCY CHANGER.
APPLICATION FILED AUG. 24, 1905.
2 SHEETS—SHEET 2.
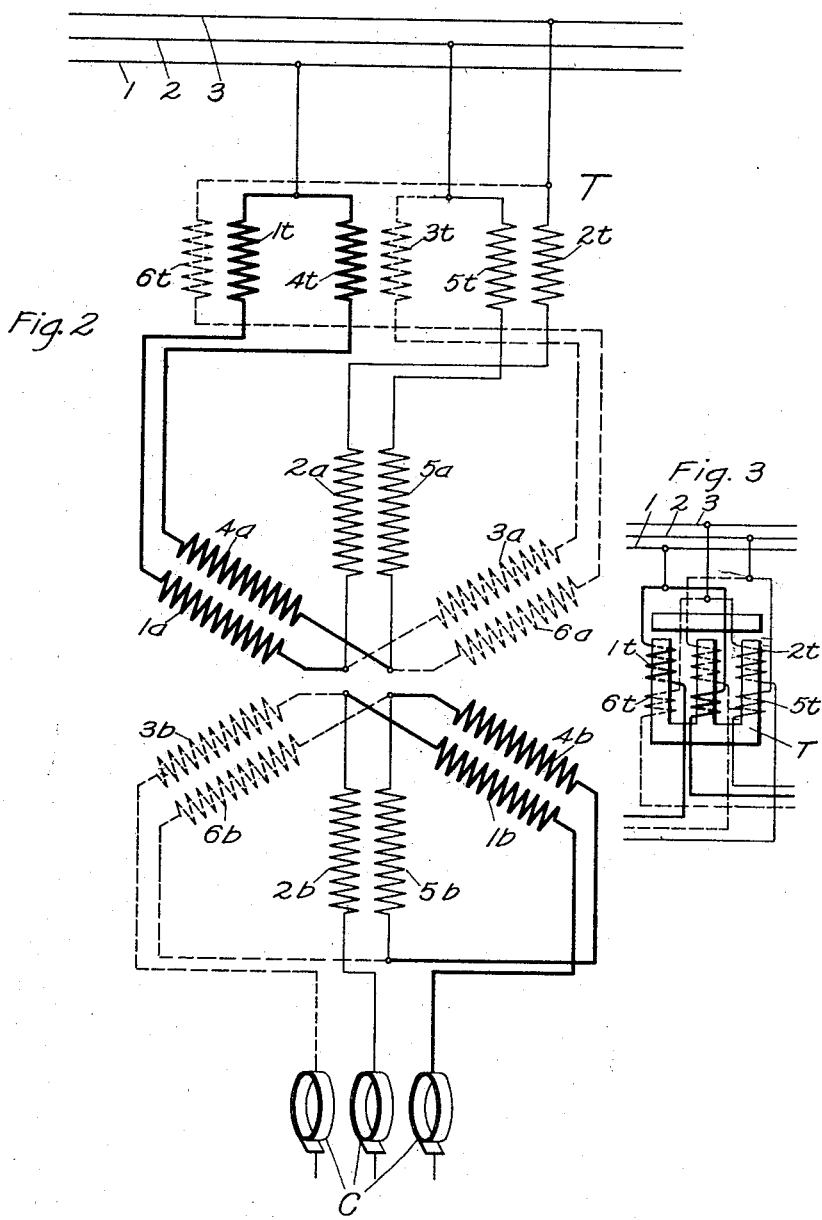

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

FREQUENCY-CHANGER.

No. 859,359.            Specification of Letters Patent.            Patented July 9, 1907.

Application filed August 24, 1905. Serial No. 275,571.

*To all whom it may concern:*

Be it known that I, ERNST F. W. ALEXANDERSON, a subject of the King of Sweden, residing at Schenectady, county of Schenectady, State of New York, have invented certain new and useful Improvements in Frequency-Changers; of which the following is a specification.

My invention relates to dynamo-electric machines adapted to transform an alternating current of one frequency into a current of a different frequency, and its object is to produce a simple and efficient form of machine for this purpose.

It is well understood in the art that induction motors, driven mechanically from an external source of power, and having one winding supplied with alternating current, will serve to transform the current with respect to its frequency, the relative frequency of the currents in the primary and secondary windings depending upon the speed at which the machine is driven. Thus, if both windings are stationary the frequency of the current induced in the secondary winding will be the same as that supplied to the primary winding. If the secondary winding is driven in the same direction as the revolving field produced by the primary winding the secondary frequency will be less than the primary, becoming zero when the secondary winding rotates in synchronism with the primary field. And on the other hand when the secondary winding is driven in the opposite direction to that of the rotation of the primary field the secondary frequency will be greater than the primary frequency by an amount depending upon the speed of rotation. These principles have been utilized heretofore in various arrangements for frequency transformers.

My invention in one aspect consists in so arranging a machine of the induction-motor type that it combines in itself both the transforming windings for producing a change in frequency and also the driving means for imparting to the transforming windings the necessary speed of rotation. I accomplish this by providing the machine with two sets of windings with different numbers of poles, one set acting as motor windings to drive the rotating member with reference to the stationary member and the other set acting as transformer windings to receive current of one frequency and to deliver current of another frequency. Since the two windings are of two different numbers of poles each set of windings acts independently of the other though both are mounted on the same magnetic core.

My invention further consists in arranging, for the purpose above set forth, a machine having the structure of a standard induction motor with both members wound in the usual way with uniform distributed coils. I accomplish the desired result by connecting the coils on each member so that they form electrically two separate windings of different pole numbers. Further, in order to obtain the minimum reactance of both motor and transformer windings, I arrange the connections so that each winding is distributed through all the slots, or in other words, so that each slot contains conductors of both windings.

My invention further consists in providing means for compounding the frequency changer for variations in load, and in this feature of my invention it is not limited to a frequency changer having both motor and transformer windings on the same cores. My invention in this aspect consists in providing means responsive to variations of current in the motor windings for controlling the voltage of the transformer windings. More specifically stated I employ a series transformer having its primary in series with one of the motor windings and its secondary in series with one of the transformer windings.

My invention further comprises the use of a series transformer of a special type which will be hereinafter described.

My invention will best be understood by reference to the accompanying drawings, in which Figure 1 shows diagrammatically a frequency changer arranged in accordance with my invention with both stator and rotor windings developed on a plane surface; Fig. 2 shows a simplified diagram of connections; and Fig. 3 shows the preferred arrangement of the compounding transformer.

In Fig. 1 A represents the stator core which in practice would consist of a slotted laminated body similar in every respect to the stator of a standard induction motor. V represents the rotor core which in practice would consist of a slotted laminated drum like the rotor of a standard induction motor. Both the stator and rotor cores are wound in the manner usual in a standard induction motor, with uniform distributed coils. The coils on each member are connected electrically to form two independent windings. Thus, on the stator core A there are formed two separate three-phase windings: the phases of one winding are indicated by $1^a$, $2^a$ and $3^a$, respectively, and are shown in heavy, light and dotted lines respectively, while the phases of the other winding are indicated by $4^a$, $5^a$ and $6^a$. In order to avoid confusion, the end connections of the two windings are shown on opposite sides of the core. By tracing out any one phase the first mentioned winding, a for instance the phase $1^a$, it will be seen that this winding is a six-pole winding, while by tracing out the phase $4^a$ it will be seen that the other winding is a four-pole winding. The two windings on the core A are connected in parallel, through compounding transformer windings which will be herein explained, to a source of three-phase current indicated by the line wires 1, 2 and 3. The windings on the core A are consequently the primaries of the motor and transformer windings of the machine. It will be understood, however, that while I have shown the two primary windings on the stator core either or both may be placed on the rotor core if preferred, the only essential being that the primary and secondary windings of each set, whether transformer or motor, should be placed on opposite cores. The two windings on the rotor core B are shown arranged similarly in every respect to the primary windings on the core A. Thus, the three phases $1^b$, $2^b$ and $3^b$ of one winding correspond in pole number to the six-pole stator winding, while the second rotor winding having the phases $4^b$, $5^b$ and $6^b$ form a four-pole winding. As in the case of the stator, the two windings are shown with their end connections made on opposite sides of the core.

It will be seen that the same number of slots are indicated on both stator and rotor. The reason for this is that for the sake of simplicity the slots on both cores are shown of the smallest possible number. In practice, however, the number of slots on each member would be much larger and in that case the two cores should be given different numbers of slots conforming to the standard induction motor numbers, in order to avoid the locking tendency which exists where both cores have the same number of slots.

It will be seen that the four-pole rotor winding is short-circuited upon itself, so that coacting with the four-pole winding it will drive the rotor core at a speed corresponding to that of a four-pole induction motor. The six-pole rotor winding on the other hand is connected to collector rings C from which a secondary circuit of different frequency may be supplied. That is, the four-pole windings act as the motor windings to the machine and the six-pole windings act as the transformer windings. Since the windings are of different numbers of poles, each set will act entirely independently of the other, although both sets are carried on the same cores.

The operation of the machine is then as follows: If three-phase current with a frequency for instance of 25 cycles is supplied to the primary six-pole winding, while the primary four-pole winding is open-circuited so that the machine is stationary, an electromotive force will be induced at the collector rings C having a frequency of 25 cycles. Now, if the primary motor winding is supplied with current at 25 cycles and if the primary motor winding is connected to produce a rotating field opposite in direction to that of the transformer winding the rotor will be driven in a direction opposite to that of the rotation of a transformer field, at a speed corresponding to that of a four-pole motor running on a 25 cycle current. The secondary transformer winding is now consequently driven at a speed, relative to the rotating transformer field, equal to the sum of the actual speed of rotation of the rotor and the rotation of the transformer field. The frequency induced at the collector ring C is consequently increased in the ratio of 4 to (4+6), that is, 4 to 10. With a constant strength of transformer field the voltage is also increased in the same proportion. Thus, for instance, if, with the rotor standing still, the secondary transformer winding produces a voltage of 90 at a frequency of 25, then, when the motor windings are energized the secondary transformer winding will produce a voltage of approximately 220 at a frequency of approximately 60. In other words the machine as shown will serve as a frequency changer to transform a current of 25 cycles to a current of 60 cycles. It should be noted that in the transformation of frequency, only part of the energy, namely six-tenths, passes through the motor windings and hence undergoes the double transformation from electrical energy to mechanical motion and back again to electrical energy; the remaining four-tenths is directly transformed by the transformer windings. The losses of double transformation are thus eliminated as to part of the energy, so that the machine has an advantage in this respect over a simple motor-generator set such as is sometimes used for a frequency changer.

In order to maintain a constant voltage at the collector rings C with varying load, or if desired, to produce a rising voltage with increase of load I provide an arrangement of transformer windings as shown. In series with each phase of one of the motor windings is inserted a primary transformer winding, while the secondary of the transformer is connected in series with a phase of one of the transformer windings of the machine. The secondary windings of the compounding transformer windings are indicated at $1^t$, $2^t$ and $3^t$, the numerals corresponding to the phases $1^a$, $2^a$ and $3^a$ of the transformer winding of the machine in series with which they are connected. The primary compounding transformer windings are indicated as $4^t$, $5^t$ and $6^t$ corresponding to the phases of the motor windings in series in which they are connected. An increase of load in the circuit supplied from the collector rings C, produces a proportional increase of current in both the motor and transformer windings of the machine, and by means of the series transformer I am able to utilize the increased current in the motor windings to maintain or to increase the voltage delivered by the machine to the secondary circuit.

For compounding in the manner just described, I prefer to employ a special compounding transformer of the type described in my former patent No. 805,253, granted to me Nov. 21, 1905. This compounding transformer is essentially a transformer so arranged that the compounding voltage is approximately in phase with the line voltage impressed on the circuit to be compounded, and at the same time the reactance drop in the secondary winding of the compounding transformer, due to current flow in the compounded circuit is substantially in quadrature with the line voltage so that the voltage in the compounded circuit is practically unaffected thereby even with great variations of current flow in the compounded circuit. Such a result may be readily obtained by constructing a transformer with an open magnetic circuit and connecting the primary and secondary windings of the transformer in different phases of the circuit to be compounded and of the circuit the current flow of which is utilized for compounding. This connection of primary and secondary in different phases is shown in Figs. 1 and 2 and the construction of the transformer is shown somewhat diagrammatically in Fig. 3. In Fig. 3 a three-phase transformer T is shown so arranged that each leg of the magnetic circuit contains an air gap. The two windings on each leg are connected in different phases of the motor and transformer windings respectively of the machine, as is clearly shown in Fig. 2. Thus, the primary winding 4ᵗ of the compounding transformer is connected in series with the phases 4ᵃ of the motor winding which is connected to line wire 1 while the corresponding secondary winding 3ᵗ of the compounding transformer is connected in series with the phase 3ᵃ of the transformer winding of the machine which is connected to line wire 2. In this arrangement, because of the open magnetic circuit of the transformer and the consequent leakage, the reactance drop in each of the secondary windings of the compounding transformer may be made substantially in quadrature with the line voltage impressed upon the transformer windings of the frequency changer so that the impressed voltage on the transformer winding of the frequency changer is affected practically to a practically negligible extent by the reactance drop no matter how great is the current flow therein, while at the same time because of the phase connection of the windings the compounding electromotive force which is added to the line voltage by secondaries of the compounding transformer is substantially in phase with the line voltage notwithstanding the dephasing effect on the relative phases of primary and secondary electro-motive forces produced by forming the transformer with an open magnetic circuit, this dephasing effect being compensated for by connecting the primary and secondary windings in different phases; that is, the added electromotive force is in proper phase for most efficient compounding.

It will be understood that my invention is not limited to the particular number of poles or phases, or the specific arrangement and connections of the several windings shown in the drawings, but that all these features may be modified as desired to meet varying requirements. Furthermore the machine may be used to transform from a lower to a higher frequency as well as from a higher to a lower. Thus the particular machine shown in the drawings might be used equally well to transform from 25 to 60 cylces.

It will be understood that I have shown the windings of the machine diagrammatically and that in practice any suitable type of winding may be employed. A form of winding particularly adapted for use in a frequency-changer arranged in accordance with my invention is shown and described in my former application, Serial No. 274,856, filed August 19, 1905.

What I claim as new and desire to secure by Letters Patent of the United States, is:

1. In a frequency changer, a stationary member, two windings of different pole numbers carried thereby, a rotatable member, and two windings carried thereby of pole numbers corresponding respectively to the stationary windings, one winding of each pole number being connected to an alternating current circuit, and one of the two other windings being short-circuited and the other connected to a second alternating current circuit of different frequency.

2. In a frequency changer, a stationary member, a rotatable member, two primary windings of different pole numbers both electrically connected to a source of alternating current, and two secondary windings of corresponding pole numbers, one of said secondary windings being short-circuited and the other provided with terminals adapted for connection to an external circuit, the primary and secondary windings of each number of poles being carried the one by the stationary member and the other by the rotatable member.

3. In a frequency changer, a stationary member, a rotatable member, a pair of transformer windings carried by said members respectively and connected to two circuits of different frequency, and a pair of motor windings of different pole number from the transformer windings carried by said members respectively, the primary motor winding being connected to the same circuit with the primary transformer winding.

4. In a frequency changer, a stationary member, a rotatable member, a pair of polyphase transformer windings carried by said members respectively and connected to two polyphase circuits of different frequency, and a pair of polyphase motor windings of different pole number from the transformer windings carried by said members respectively, the primary motor winding being connected to the same circuit with the primary transformer winding in such manner as to produce relative rotation of the transformer windings in the opposite direction to the rotation of the transformer field relative to the secondary transformer winding.

5. In a frequency changer, a stationary magnetic core wound with uniform distributed coils connected to form two separate windings of different pole numbers, and a rotatable core similarly wound, the pole numbers of the rotatable windings corresponding to the stationary windings respectively, one winding of each pole number being connected to an alternating-current circuit, and one of the remaining windings being short-circuited and the other connected to a second alternating-current circuit of different frequency.

6. In a frequency changer, a stationary magnetic core wound with uniform distributed coils connected to form two separate windings of different pole numbers, and a rotatable core similarly wound, the pole numbers of the rotatable windings corresponding to the stationary windings respectively, the two windings of one pole number being connected as motor windings to drive the rotatable core, and the two other windings being connected as transformer windings in primary and secondary alternating current circuits of different frequency.

7. In a frequency changer, a primary magnetic core wound with uniform distributed coils connected to form two separate windings of different pole numbers, both of said windings being connected to a primary alternating-current circuit, and a secondary core similarly wound, the two secondary windings corresponding in pole numbers to the primary windings respectively, one of said secondary windings being short-circuited and the other connected to a secondary alternating-current circuit of different frequency from the primary circuit.

8. In a frequency changer, a primary magnetic core wound with uniform distributed coils connected to form two separate polyphase windings of different pole numbers, said two windings being connected to a primary alternating-current circuit in such manner as to produce rotating fields in opposite directions in said core, and a secondary core similarly wound, the secondary windings corresponding in pole numbers to the primary windings, one of said secondaries being short-circuited and the other connected to a secondary circuit of higher frequency than the primary circuit.

9. In a frequency changer, two relatively-movable magnetic cores, and two windings of different pole numbers on each core, both windings on one core being connected to the same alternating-current circuit, and one of the windings on the other core being connected to a second alternating-current circuit and the other short-circuited.

10. In a frequency changer, two relatively-movable magnetic cores, each wound with uniform distributed coils electrically connected to form two separate windings of different pole numbers, both windings on one core being connected to the same alternating-current circuit, and one of the windings on the other core being connected to a second alternating-current circuit and the other short-circuited.

11. In a frequency changer, a stationary slotted magnetic core wound with uniform distributed coils connected to form two separate windings of different pole numbers, each slot containing conductors of both windings, and a rotatable slotted core similarly wound, one winding of each pole number being connected to an alternating-current circuit, and one of the two remaining windings being short-circuited and the other connected to a second circuit of different frequency.

12. In a frequency changer, a stationary magnetic core, two windings of different pole members carried thereby, a rotatable magnetic core, and two windings carried thereby corresponding in pole numbers to the stationary windings, the two windings of one pole number being connected as motor windings to drive the rotatable core, and the other two windings being connected as transformer windings in primary and secondary alternating-current circuits of different frequency.

13. In a frequency changer, a stationary slotted magnetic core wound with uniform distributed coils connected to form two separate windings of different pole numbers, each slot containing conductors of both windings, and a rotatable slotted core similarly wound, the two windings of one pole number being connected as motor windings to drive the rotatable core, and the other two windings being connected as transformer windings in primary and secondary alternating-current circuits of different frequency.

14. In a frequency changer, two pairs of windings, one winding of each pair being stationary and the other rotatable and the two rotatable windings being mechanically connected, one pair of windings being connected as motor windings to drive the rotatable winding and the other pair being connected as transformer windings in primary and secondary alternating-current circuits of different frequency, and means responsive to variation in current in the motor windings for increasing the voltage delivered to said secondary circuit.

15. In a frequency changer, two pairs of windings, one winding of each pair being stationary and the other rotatable and the two rotatable windings being mechanically connected, one pair of windings being connected as motor windings to drive the rotatable windings and the other pair being connected as transformer windings in primary and secondary alternating-current circuits of different frequency, and a series transformer having its windings connected in series with a motor winding and with a transformer winding respectively.

16. In a frequency changer, two pairs of windings, one winding of each pair being stationary and the other rotatable and the two rotatable windings being mechanically connected, one pair of windings being connected as motor windings to drive the rotatable windings and the other pair being connected as transformer windings in primary and secondary alternating-current circuits of different frequency, and voltage controlling means adapted to compensate for increase in load.

17. In a frequency changer, a stationary magnetic core, two windings of different pole numbers carried thereby, a rotatable magnetic core, two windings carried thereby corresponding in pole numbers to the stationary windings, the two windings of one pole number being connected as motor windings to drive the rotatable core, the other two windings being connected as transformer windings in primary and secondary alternating-current circuits of different frequency, and voltage controlling means adapted to compensate for increase in load.

18. In a frequency changer, a stationary magnetic core, two windings of different pole numbers carried thereby, a rotatable magnetic core, two windings carried thereby corresponding in pole numbers to the stationary windings, the two windings of one pole number being connected as motor windings to drive the rotatable core, the other two windings being connected as transformer windings in primary and secondary alternating-current circuits of different frequency, and means responsive to variation in current in the motor windings for increasing the voltage of the transformer windings.

19. In a frequency changer, a stationary magnetic core, two windings of different pole numbers carried thereby, a rotatable magnetic core, two windings carried thereby corresponding in pole numbers to the stationary windings, the two windings of one pole number being connected as motor windings to drive the rotatable core, the other two windings being connected as transformer windings in primary and secondary alternating-current circuits of different frequency, and a series transformer having its windings connected in series with one of said motor windings and with one of said transformer windings respectively.

20. In a frequency changer, a stationary magnetic core, two polyphase windings of different pole numbers carried thereby, a rotatable magnetic core, two polyphase windings carried thereby corresponding in pole numbers to the stationary windings, the two windings of one pole number being connected as motor windings to drive the rotatable core, the other two windings being connected as transformer windings in primary and secondary alternating-current circuits of different frequency, and a transformer of the open core type having a secondary winding in series with a phase of one of said transformer windings and a primary winding in inductive relation to said secondary winding and connected in series with a different phase of one of said motor windings.

21. In a frequency changer, two pairs of polyphase windings, one winding of each pair being stationary and the other rotatable and the two rotatable windings being mechanically connected, one pair of windings being connected as motor windings to drive the rotatable windings and the other pair being connected as transformer windings in primary and secondary alternating-current circuits of different frequency, and a transformer of the open core type having a secondary in series with a phase of one of said transformer windings and a primary winding in inductive relation to said secondary winding and connected in series with a different phase of one of said motor windings.

22. In a dynamo-electric machine, two relatively movable slotted magnetic cores each wound with distributed coils all of the same width forming mechanically a single winding but electrically connected to form two separate windings of different pole numbers.

23. In a dynamo-electric machine, two relatively movable slotted magnetic cores each wound with distributed coils all of the same width forming mechanically a single winding but electrically connected to form two separate windings of different pole numbers each slot on each core containing conductors of both windings.

In witness whereof I have hereunto set my hand this 23rd day of August, 1905.

ERNST F. W. ALEXANDERSON.

Witnesses:
BENJAMIN B. HULL,
HELEN ORFORD.